Patented July 4, 1933

1,916,236

UNITED STATES PATENT OFFICE

LONNIE W. RYAN, OF MERRICK, NEW YORK, ASSIGNOR TO TITANIUM PIGMENT COMPANY, INC., OF NEW YORK, N. Y., A CORPORATION OF MAINE

METHOD OF PRECIPITATING TITANIUM COMPOUNDS

No Drawing. Original applications filed March 27, 1928, Serial Nos. 265,213 and 265,214, now Patents Nos. 1,820,987 and 1,820,988, dated September 1, 1931, and in Germany March 15, 1929. Divided and this application filed June 13, 1931. Serial No. 544,285.

This application is a division of my applications filed March 27, 1928, Serial Numbers 265,213 and 265,214, which have since been granted as U. S. Letters Patent Nos. 1,820,987 and 1,820,988 both dated September 1, 1931.

My present invention relates to titanium compounds and methods for their economical manufacture, which compounds have varied uses in the industrial arts, and more particularly relates to improved methods for the economical production of an essentially pure titanium oxide pigment with the practical exclusion of all undesired impurities, especially iron compounds, which pigment will be exceptionally white in color, and will also possess increased hiding power when compared with other pigments now in use. My improved pigment product is also characterized by exceptional fineness, smoothness and softness, which qualities render same highly useful and desirable when such products are employed as pigments in paints and for other purposes.

It is believed that the hiding power of titanium pigments is due, among other things, to the degree of dispersion of the individual particles. In the manufacture of composite pigments, i. e., those containing a base such as barium sulphate upon which the titanium compounds have been fixed, the hiding power has been developed to a high degree, apparently due to the dispersing effect of the base and its preventing aggregation of the precipitated titanium particles.

Such methods of producing composite titanium oxide pigments are set forth in U. S. Louis E. Barton reissued Patent No. 14,289 of April 24, 1917 and in U. S. Louis E. Barton Patent No. 1,409,648 of March 14, 1922. Such bases contained in these composite titanium pigments may be termed insoluble dispersing agents.

I have now discovered novel and improved methods of precipitating titanium from solutions containing same without the presence of these insoluble dispersing agents, but in such a manner that there results, upon calcining, an essentially pure titanium oxide having units of hiding power per unit of titanium oxide, approaching, if not entirely equal to, that of the above mentioned composite pigments. My improved method may be characterized as consisting in the slow mixing together of a mineral acid solution of titanium and a hot dilute solution containing an organic acid or organic acid compound such as, for example, tannic acid, tartaric acid, citric acid, oxalic acid, gallic acid, sodium tartrate, ammonium citrate, etc. Preferably this titanium solution is slowly added to the solution containing an organic acid.

As an alternative method herein claimed the organic acid or organic acid compound with or without a small percentage of phosphoric acid or phosphoric acid compound may be added to the mineral acid solution of titanium and this solution then slowly added to hot water. These organic compounds, which I shall call soluble dispersing agents, evidently have a somewhat similar effect to that of the insoluble dispersing agents. The individual titanium particles of the precipitate are uniformly of such structure and dimension and so dispersed that there is developed far greater hiding power, upon calcining, than has hitherto been attained. This unprecedented hiding power which it is possible to produce in the pigment product, I attribute both to the presence of the organic compounds during hydrolysis, and also to the way in which the hydrolysis is caused to take place.

Relatively small amounts of these soluble dispersing agents are required—much less than that required for a double decomposition reaction with all of the titanium. The composition of the final product varies slightly with variation in condition of its preparation.

A typical analysis is as follows:—

| | Per cent |
|---|---|
| Titanic oxide | 98.75 |
| Sulphuric anhydride | .12 |
| Phosphoric anhydride | .60 |
| Loss upon calcination | .43 |

In order that the method of preparation of my product may be more readily understood, I shall give in detail two examples, although I do not wish to be limited thereby. The process is capable of considerable variation in yielding the product desired.

With an organic acid or an organic acid compound only, some titanium ores such as rutile may be used direct, yet I have found that more uniform results are obtained if commercial titanium oxide, containing only small amounts of impurities, is used.

The titanium is brought into solution in a mineral acid, such as sulphuric acid, and all iron present is reduced to the ferrous condition. This reduction may be accomplished by any of the known methods, such as by the introduction of metallic zinc. In order to be sure that no ferric iron will be formed during precipitation, I prefer to carry the reduction of the solution to the point where it contains one or two grams per litre of the titanium, calculated as titanium oxide, in the titanous condition.

*Example I.*—To 3,000 pounds of sulphate solution containing 7% titanium oxide there is added 32.3 pounds of oxalic acid. 1,500 gallons of water are brought to a temperature of 90° C. The sulphate solution, containing the oxalic acid is then added to the water during the course of one hour. Agitation is continuous and the temperature is maintained about constant.

By the time the solutions are thoroughly mixed, about 95% of the titanium will have been precipitated as a basic sulphate in an extremely fine state of subdivision, but in such a form that it settles well and may be readily filtered and washed. After filtration or separation by other means from the mother liquor, the precipitate is calcined at a temperature of from 700° to 1000° C.

*Example II.*—The most readily available titanium ore is ilmenite, or titaniferous iron ore, containing a maximum of 52.7% titanium oxide ($TiO_2$) and 47.3% ferrous oxide (FeO) corresponding to a formula $TiO_2$, FeO. Ilmenite usually contains small amounts of other oxides such as alumina, zirconia, silica, etc. Such an ore is brought into solution by any of the well known methods, such as, for example, by digestion with concentrated sulphuric acid and subsequent treatment with water.

Such a solution prepared by me and designated (A) analyzed as follows:—

| | Per cent |
|---|---|
| Titanium oxide ($TiO_2$) | 5.71 |
| Ferrous oxide (FeO) | 5.24 |
| Alumina, zirconia, etc. ($Al_2O_3, ZrO_2$) | 0.66 |
| Sulphuric acid in combination | 23.81 |
| Uncombined sulphuric acid | 2.86 |

Before making the precipitation of titanium from such solution it is desirable to reduce all iron present in the solution to the ferrous condition. This reduction may be accomplished by any of the well known methods, such as by the introduction of metallic iron or zinc. In order to be sure that no ferric iron will be formed during precipitation I prefer to carry the reduction of the solution to the point where it contains one or two grams per litre of the titanium, calculated as titanium oxide, in the titanous condition.

32.3 pounds of oxalic acid and 2.4 pounds of phosphoric acid are dissolved in 3680 pounds of the above mentioned solution (A) of ilmenite. 300 cu. ft. of water are brought to a temperature of about 98° C. This solution, containing the oxalic acid and the phosphoric acid, is then slowly added to the water during the course of one hour. Agitation is continuous and the temperature is maintained about constant. By the time the solutions are thoroughly mixed, about 95% of the titanium will have been precipitated, substantially as a basic sulphate, in an extremely fine state of subdivision, but in such a form that it settles well and may be readily filtered and washed. A part of the phosphoric acid also combines with the titanium and occurs in the precipitate. After filtration or separation by other means from the mother liquor, the precipitate is calcined at a temperature of from 700° to 1000° C.

My product is characterized as being a soft, smooth powder, in a uniform, fine state of subdivision with the individual particles of titanium oxide uniformly dispersed in the product from the hydrolytic precipitation with organic acid compounds acting as soluble dispersing agents before calcination as I have hereinbefore described. In color such product is more nearly white than has hitherto been produced by any methods known to me.

I claim as my invention:

1. In the precipitation of titanium compounds by hydrolysis from a mineral acid solution containing titanium, the steps which consist in dissolving an organic acid in said solution, and thereafter adding the resultant solution to hot water.

2. In the precipitation of titanium compounds by hydrolysis from a sulphuric acid solution containing titanium, the steps which consist in dissolving oxalic acid in said solution, and thereafter adding the resultant solution to hot water.

3. In the precipitation of titanium compounds by hydrolysis from a mineral acid solution containing titanium, the steps which consist in dissolving an organic acid compound in said solution, and thereafter adding the resultant solution to hot water.

4. In the precipitation of titanium compounds by hydrolysis from a mineral acid solution containing titanium, the steps which consist in dissolving phosphoric acid and an organic acid in said solution, and thereafter adding the resultant solution to hot water.

5. In the precipitation of titanium compounds by hydrolysis from a mineral acid solution containing titanium, the steps which consist in dissolving a phosphoric acid compound and an organic acid in said solution, and thereafter adding the resultant solution to hot water.

6. In the precipitation of titanium compounds by hydrolysis from a sulphuric acid solution containing titanium, the steps which consist in dissolving phosphoric acid and oxalic acid in said solution, and thereafter adding the resultant solution to hot water.

7. In the precipitation of titanium compounds by hydrolysis from a mineral acid solution containing titanium, the steps which consist in dissolving a phosphoric acid compound and an organic acid compound in said solution, and thereafter adding the resultant solution to hot water.

8. In the precipitation of titanium compounds by hydrolysis from a mineral acid solution containing titanium, the steps which consist in dissolving an organic acid in said solution, and thereafter slowly adding the resultant solution to hot water while agitating the mixture.

9. In the precipitation of titanium compounds by hydrolysis from a mineral acid solution containing titanium, the steps which consist in dissolving an organic acid compound in said solution, and thereafter slowly adding the resultant solution to hot water while agitating the mixture.

10. In the precipitation of titanium compounds by hydrolysis from a mineral acid solution containing titanium, the steps which consist in dissolving phosphoric acid and an organic acid in said solution, and thereafter slowly adding the resultant solution to hot water while agitating the mixture.

11. In the precipitation of titanium compounds by hydrolysis from a mineral acid solution containing titanium, the steps which consist in dissolving a phosphoric acid compound and an organic acid in said solution, and thereafter slowly adding the resultant solution to hot water while agitating the mixture.

12. In the precipitation of titanium compounds by hydrolysis from a mineral acid solution containing titanium, the steps which consist in dissolving phosphoric acid and an organic acid compound in said solution, and thereafter slowly adding the resultant solution to hot water while agitating the mixture.

13. In the precipitation of titanium compounds by hydrolysis from a mineral acid solution containing titanium, the steps which consist in dissolving a phosphoric acid compound and an organic acid compound in said solution, and thereafter slowly adding the resultant solution to hot water while agitating the mixture.

14. In the preparation of titanium compounds by hydrolysis from a mineral acid solution containing titanium, the steps which comprise dissolving an organic acid in said solution, adding the resultant solution to hot water, separating the precipitate formed, and calcining same.

15. In the preparation of titanium compounds by hydrolysis from a mineral acid solution containing titanium, the steps which comprise dissolving an organic acid compound in said solution, adding the resultant solution to hot water, separating the precipitate formed, and calcining same.

16. In the preparation of titanium compounds by hydrolysis from a mineral acid solution containing titanium, the steps which comprise dissolving phosphoric acid and an organic acid in said solution, adding the resultant solution to hot water, separating the precipitate formed, and calcining same.

17. In the preparation of titanium compounds by hydrolysis from a mineral acid solution containing titanium, the steps which comprise dissolving a phosphoric acid compound and an organic acid in said solution, adding the resultant solution to hot water, separating the precipitate formed, and calcining same.

18. In the preparation of titanium compounds by hydrolysis from a mineral acid solution containing titanium, the steps which comprise dissolving phosphoric acid and an organic acid compound in said solution, adding the resultant solution to hot water, separating the precipitate formed, and calcining same.

19. In the preparation of titanium compounds by hydrolysis from a mineral acid solution containing titanium, the steps which comprise dissolving a phosphoric acid compound and an organic acid compound in said solution, adding the resultant solution to hot water, separating the precipitate formed, and calcining same.

LONNIE W. RYAN.